UNITED STATES PATENT OFFICE.

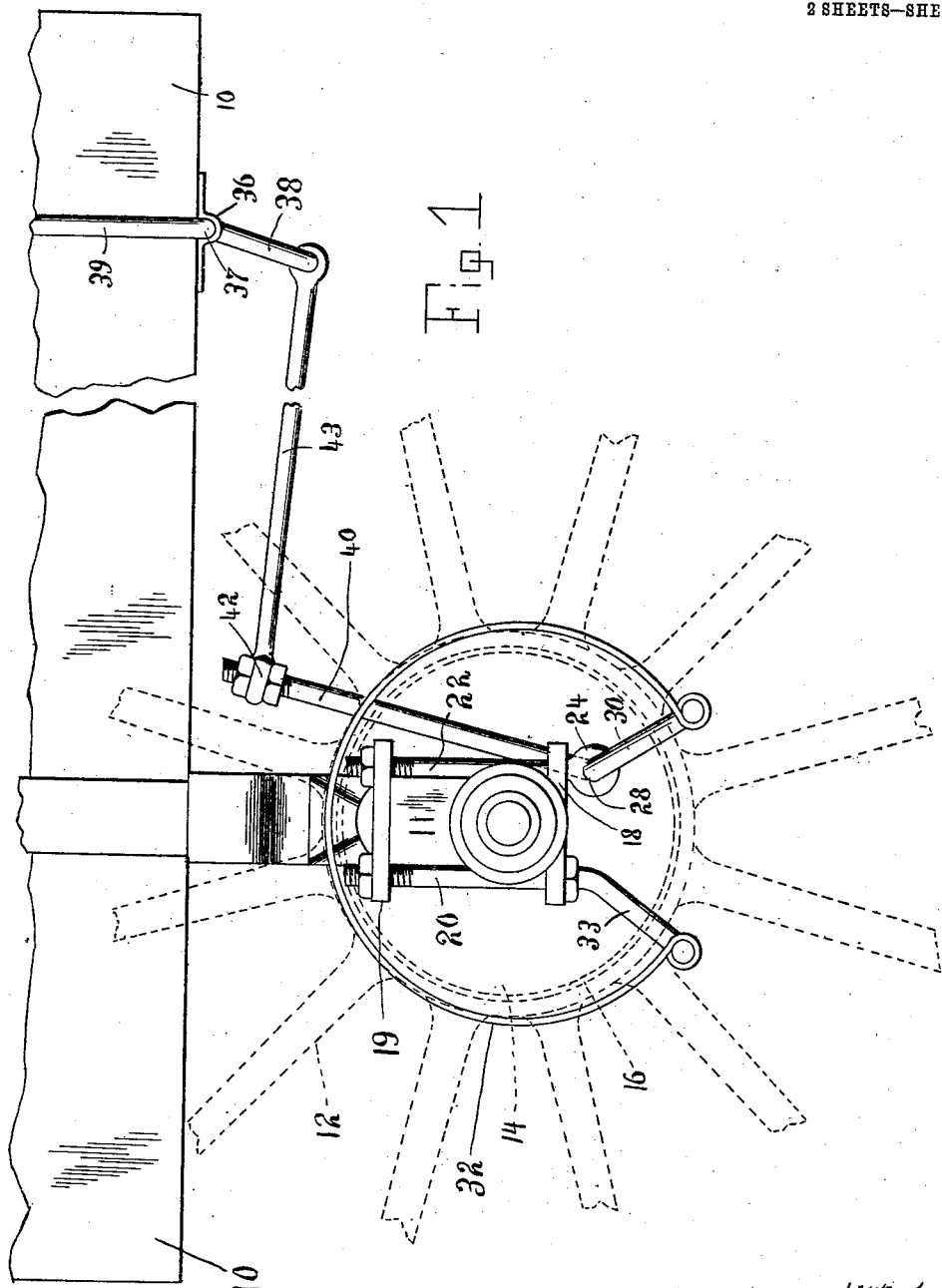

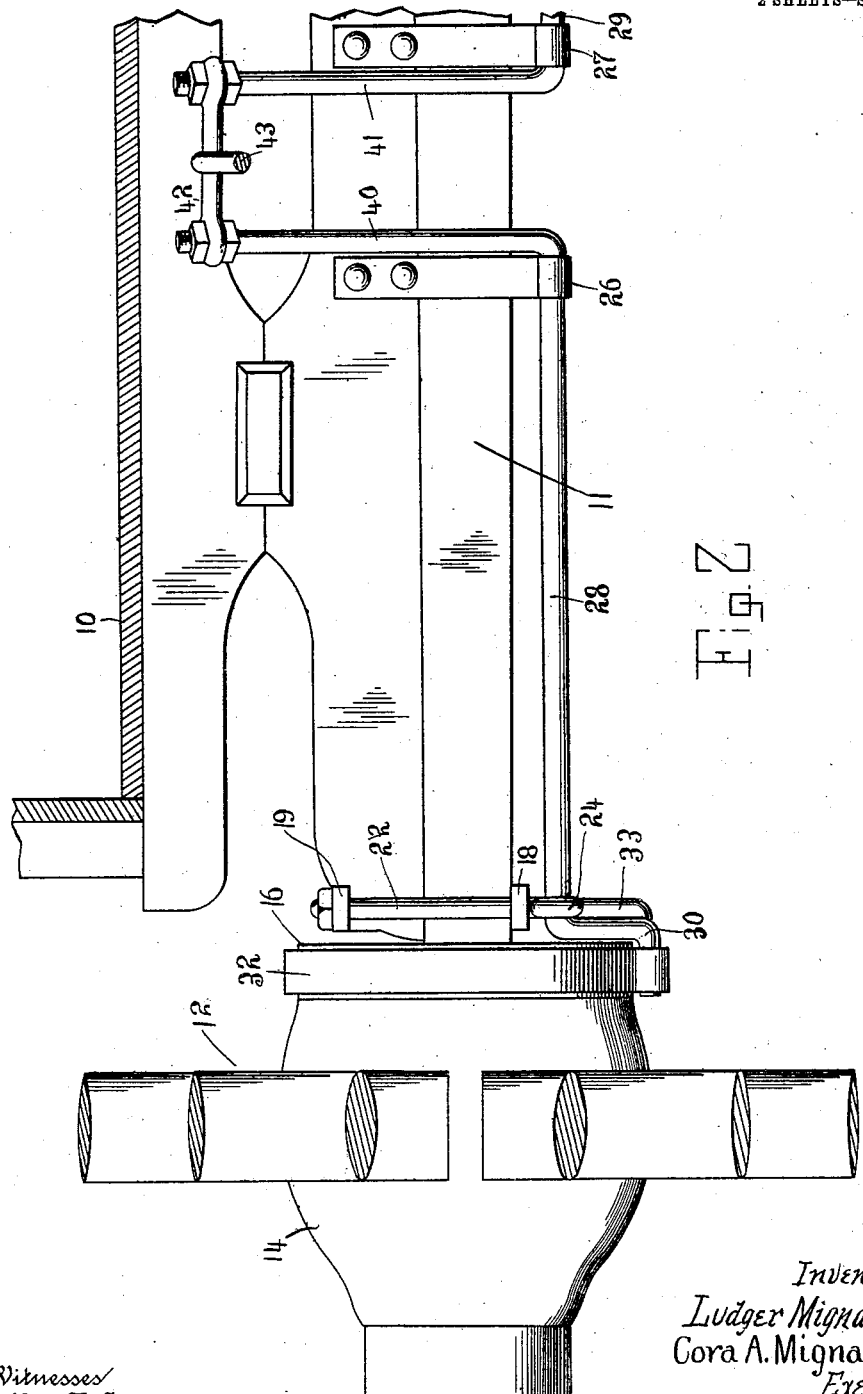

LUDGER MIGNAULT, DECEASED, LATE OF HALLOWELL, MAINE; CORA A. MIGNAULT, EXECUTRIX.

VEHICLE-BRAKE.

968,867.   Specification of Letters Patent.   Patented Aug. 30, 1910.

Application filed August 9, 1909. Serial No. 512,040½.

*To all whom it may concern:*

Be it known that LUDGER MIGNAULT, deceased, late a citizen of the United States, and residing at Hallowell, in the county of Kennebec and State of Maine, did invent certain new and useful Improvement in Vehicle-Brakes; and I, CORA A. MIGNAULT, executrix of the estate of said LUDGER MIGNAULT, deceased, hereby declare the following to be a full, clear, and exact description of the invention, such as will enable others skilled in the art to which it appertains to make and use the same.

This invention relates to brakes for vehicles, more particularly to the class wherein the brake is applied to the hubs of the rear wheels, and has for one of its objects to improve the construction and increase the efficiency and utility of devices of this character.

With this and other objects in view, the invention consists in certain novel features of construction as hereinafter shown and described and then specifically pointed out in the claim; and, in the drawings illustrative of the preferred embodiment of the invention, Figure 1 is a side elevation of the rear portion of a vehicle including portions of the body and rear axle and a portion of one of the bearing wheels. Fig. 2 is a rear elevation of the same, with the body in section.

The improved device may be applied to any of the various forms of vehicles, but is more particularly designed for use in connection with heavy freight and farm wagons and for the purpose of illustration is shown applied to a vehicle of this class, and in the drawings illustrating the preferred embodiment of the invention is shown portions of the body or box 10, rear axle 11 and a part of one of the rear bearing wheels at 12, these parts being of the usual construction. The inner portion of the hub 14 is formed with a circular brake grip surface covered with an annular metal bearing band 16 to which one of the brake bands of the improved device is applied.

Connected to the rear axle at its ends are grip devices, one of which only is shown and comprises plates 18—19 through which a rod 20 extends at one side of the axle, and through which a similar rod 22 extends at the opposite side of the axle. The rods are threaded to receive clamp nuts above the plates, as shown.

It will be understood that one of the brake devices is applied to each of the rear wheels, but as the brake devices are precisely alike only one is shown. By this means the rods are not only firmly coupled to the axle, but are likewise adjustable to adapt them to axles of various thicknesses. The rod 20 is located rearwardly of the axle and with its lower end outturned at 33 to extend past the bearing band 16, as shown. The lower end of the rod 22 is formed with an eye 24, the eye serving as a stop to limit the upward movement of the rod, as shown.

Connected to the forward face of the axle near the center thereof are hangers 26—27, and mounted for rotation through these hangers and likewise through the eyes 24, one only of which is shown, are rods 28—29. The outer end of the rod 28 is formed with a crank 30 extending to a point opposite the wear band 16, while the rod 29 is likewise formed with a similar crank terminating opposite the wear band of the opposite hub, not shown. A brake band 32 is connected at its ends respectively to the offset 33 of the rods 20 and the crank member 30 of the rod 28. The hub of the opposite wheel is provided with one of the brake bands in precisely the same manner, but is not shown as it is not deemed necessary to duplicate the parts. By this means it will be obvious that when the shafts 28—29 are oscillated in one direction the brake bands will be applied to the wear bands of the hubs, and released therefrom when the rods are reversed in position, as hereinafter explained.

Connected to the lower face of the body 10 at any convenient point is a bearing 36, and mounted for oscillation through this bearing is a shaft 37 having a lateral crank 38 bent therein, and with a lever arm 39 bent from the shaft, and extending to a point convenient to the driver upon the seat of the vehicle. The inner ends of the rods 28—29 are bent laterally as shown at 40—41, and coupled by a transverse member 42, and coupled between this member 42 and the crank 38 is a rod 43.

The portions 40—41 extend substantially vertical, or to a point near the bottom of the body 10, and remain in this position when the brake bands are not applied, or while they remain in inoperative position. The brake bands 32 are formed of relatively heavy resilient material, preferably spring steel, and when in their normal or inoperative position, their resiliency serves to maintain the offsets 33 and the crank members 30 in distended position, with the brake bands out of engagement with the wear bands, as will be obvious. When the brake is to be applied it is only necessary for the driver to operate the hand lever 39 to cause the crank 38 through its connecting rod 43 to draw the vertical portions 40—41 of the rods 28—29 forwardly, and thus cause the cranks 30 to apply the brakes, the force of the application of the brake being under the control of the driver, as will be obvious.

By this arrangement a simply constructed and easily applied and operating brake device is produced, which may be readily applied to vehicles of various kinds without material structural changes.

The improved device may be inexpensively manufactured, and will apply the brake where its pressure will be least observed or in the way of other portions of the running gear.

What is claimed is:—

The combination with a vehicle including an axle having journals at the ends, bearing wheels mounted upon said axle journals and each including a hub having a continuous brake face at its inner end, a resilient divided brake band bearing around each brake face, clip plates bearing against the lower and upper faces of the axle, a clamp rod extending through said plates at one side of the axle and provided with a lateral offset at one end and connected to one end of the brake band, a clamp rod extending through the clip plates at the opposite side of the axle and with an eye at one end and bearing upon one of the clip plates, a rod mounted for rotation through said eye and formed with a lateral offset at one end engaging the opposite end of the brake band, and means for oscillating said rod to cause the band to be applied to the brake face.

In testimony whereof, I affix my signature, in presence of two witnesses.

CORA A. MIGNAULT,
*Executrix of the estate of Ludger Mignault, deceased.*

Witnesses:
J. E. LEIGHTON, Jr.,
C. H. DUDLEY.